United States Patent [19]

Ouchi

[11] Patent Number: 4,978,234
[45] Date of Patent: Dec. 18, 1990

[54] BEARING UNIT HAVING SENSOR

[75] Inventor: Hideo Ouchi, Sagamihara, Japan

[73] Assignee: Nippon Seiko Kabushiki Kaisha, Tokyo, Japan

[21] Appl. No.: 375,691

[22] Filed: Jul. 5, 1989

[30] Foreign Application Priority Data

Jul. 28, 1988 [JP] Japan .............................. 63-99109[U]

[51] Int. Cl.⁵ ............................................. F16C 19/52
[52] U.S. Cl. ..................................... 384/448; 340/682
[58] Field of Search ............... 384/448, 446, 544, 589; 340/682

[56] References Cited

U.S. PATENT DOCUMENTS 4,069,435 1/1978 Wannerskog et al. .
4,667,156 5/1987 Machino et al. .
4,795,278 1/1989 Hayashi .
4,865,468 9/1989 Kato et al. ........................ 384/448

FOREIGN PATENT DOCUMENTS 5246331 11/1974 Japan .
63-166601 7/1988 Japan .

Primary Examiner—Lenard A. Footland
Attorney, Agent, or Firm—Hedman, Gibson, Costigan & Hoare

[57] ABSTRACT

A bearing unit has a sensor for sensing rotating speed of a wheel. A concave or a convex portion is formed on an end surface of a wheel shaft rotating with a rotating inner ring member. A disklike sensor rotor forms on its center a convex or a concave portion which is fit to said concave or convex portion of the wheel shaft.

A sensor is attached to a lid body covering an end portion opening of an outer ring member. Install length of the sensor rotor becomes small so that the length of the entire bearing unit becomes small.

1 Claim, 4 Drawing Sheets

FIG 1
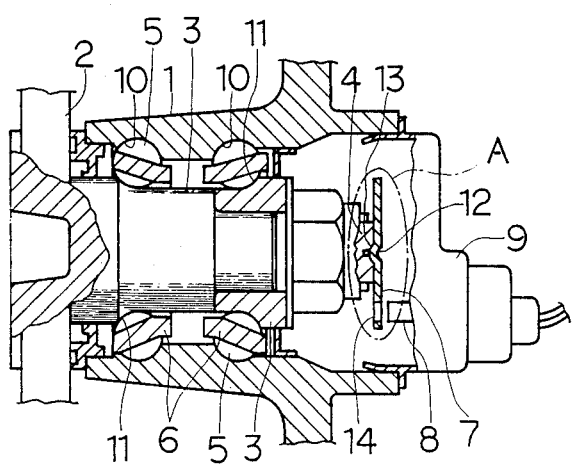
FIG 2
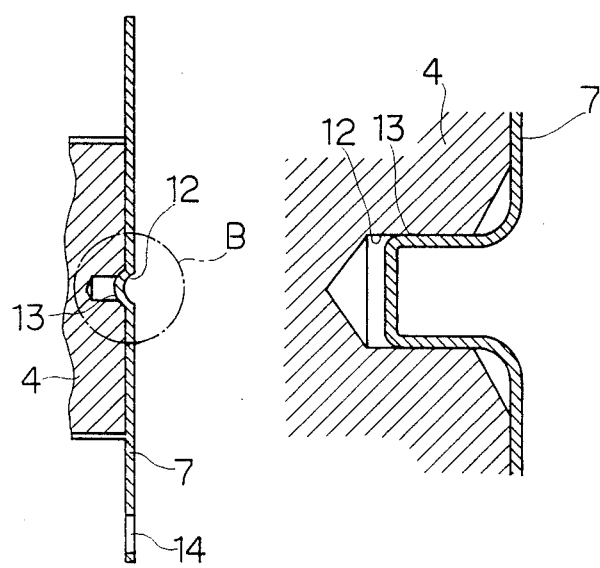
FIG 4

BEARING UNIT HAVING SENSOR

BACKGROUND OF THE INVENTION

The present invention relates to a bearing unit with a sensor which supports an automobile wheel rotatably and is utilized to sense a rotating speed of the wheel.

RELATED ART

Automobile wheels are supported rotatably by bearing units which incorporate rolling bearings. An automobile incorporated with auti-lock bearing system (hereinafter ABS) senses the rotating speed of the wheel by the bearing unit, and prevents the stoping of the wheel before the automobile stops at the time of braking.

FIG. 9 shows an example of a conventional bearing unit sensing the rotating speed. FIG. 9 shows a rotation-supporting portion of a non-driving wheel, which corresponds to a front wheel in a FR-type automobile and a rear wheel in FF-type automobile. In FIG. 9, an outer ring 1 is mounted on the automobile body side and does not rotate. An inner ring 3 Is penetrated on the inner side thereof by a wheel shaft 4. On condition of being supported by retainers 6,6, rolling elements 5,5 are installed between inner raceway tracks 10,10 formed on the inner circumference surface of the outer ring 1 and outer raceway tracks 11,11 formed on the outer circumference surfaces of the inner ring 3 and the wheel shaft 4. To the end portion of the wheel shaft 4, a flange 2 is secured circumferentially, and the wheel is attachable to the frange 2.

In the above-mentioned bearing unit, by following the rotation of rolling elements 5,5, the wheel secured to the frange 2 on the outer circumference surface of the wheel shaft 4 is able to rotate against the outer ring 1 mounted unrotatably to the automobile body.

ABS is provided in order to prevent the danger such as increment of braking distance, uncapability of changing direction and the like which are followed by the wheel supported ratatably against the outer ring 1 being locked in a early stage at time of braking. In order to do so, it is necessary to sense the rotating speed of the wheel at the time of braking and then adjust the hydraulic pressure of the braking device by corresponding with the rotating speed.

Therefore in the conventional bearing unit shown in FIG. 9, on the outer surface of the end portion of the wheel shaft 4, a cylindrical-type sensor rotor 7 is fit and secured, and a sensor 8 is secured, opposing the end edge portion of the sensor rotor 7, on a lid body 9 covering an opening of the end portion of the outer ring 1. So that the rotating speed of the wheel shaft 4 can be sensed.

However the above mentioned conventional bearing unit with a sensor to be constructed and functioned as described above has following porblems. In order to secure the sensor rotor 7 to the wheele shaft 4, the sensor rotor 7 is fit on the outer surface of the wheel shaft 4. Therefore the fitting length 1 must be taken long (at least 5mm) to have sufficient installment strength, so that the shaft-direction (left and right directions in FIG. 9) length of the bearing unit became long.

SUMMARY OF THE INVENTION

Accordingly, it is an object of the present invention to provide an improved bearing unit with a sensor wherein above mentioned problems can be solved.

In accordance with the present invention, the foregoing object is achieved by providing a bearing unit with a sensor comprising a non-rotating outer ring-like member forming an inner raceway track on an inner circumference surface thereof a rotating inner ring-like member forming an outer raceway track on an outer circumference surface thereof, a rolling bearing having a plurality of rolling elements contacting the inner receway track and the outer raceway track respectively, a sensor rotor secured on the end surface of the wheel shaft rotating with the inner ring-like member, and a sensor attached, opposing the sensor rotor, to a lid body covering an end portion opening of the outer ring-like member.

Further, in a first embodiment of a bearing unit with a sensor of the present invention, a cancave portion or a convex portion are formed on the end surface center of the wheel shaft, and a convex portion or a cancave portion being fit to the cancave portion or the convex portion of the wheel shaft are formed on a center portion of a disklike sensor rotor, and then, on condition that the cancave portion and the convex portion are fit, the sensor rotor are secured by welding to the end surface of the wheel shaft.

In a second embodiment of a bearing unit with a sensor of the present invention, a stepped small diameter portion are formed on an end surface circumference edge portion of the wheel shaft, and a sensor rotor are formed into a ring shape, and then an inner circumference edge portion of the sensor rotor are secured to the small diameter portion of the wheel shaft. Further the sensor rotor are secured to the end surface of the wheel shaft by a plurality of the end circumference edge portions of the small diameter portion being staken outwardly toward the inner circumference edge of the sensor rotor.

In a bearing unit with a sensor of the present invention, the way of sensing the rotating speed of the wheel is identical with the above mentioned conventional bearing unit.

However, according to a bearing unit with a sensor of the present invention including the first and second embodiments, the installment length of the sensor rotor becomes small, so that the length of the entire bearing unit also becomes small.

BRIEF DESCRIPTION OF THE DRAWINGS

FIG. 1 through 5 show a first embodiment of a bearing unit with a sensor according to the present invention.

FIG. 1 is a sectional view showing an entire structure of the embodiment of the present invention.

FIG. 2 is an enlarged sectional view of A portion in FIG. 1.

FIG. 3 is a side view of FIG. 2 from right-hand direction.

FIG. 4 is an enlarged sectional view of B portion in FIG. 2 showing another example of cancave and convex portions.

FIG. 5 is a side view showing another example of outer circumference shape of a sensor rotor corresponding to C portion in Fiture 3.

FIG. 6 is a sectional view showing an entire structure of the embodiment of the present invention.

FIG. 7 is enlarged sectional view of D portion in FIG. 6.

FIG. 8 is a side view of FIG. 7 from right-hand direction.

DETAILED DESCRIPTION OF THE PREFERRED EMBODIMENT

Next, preferred embodiments of the present invention will now be described with reference to drawings.

Figure 3:
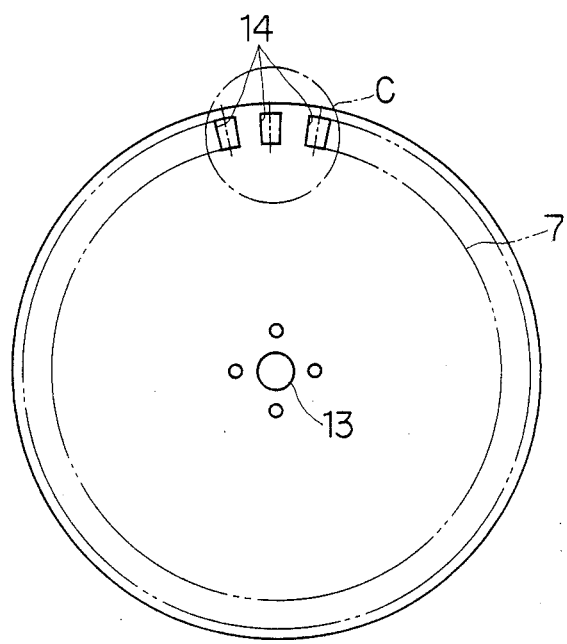
Figure 5:
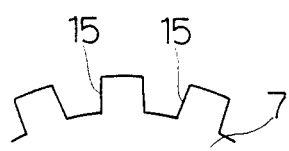

FIGS. 1 through 5 show a first embodiment of a bearing unit with a sensor, FIG. 1 being a sectional view showing an entire structure, FIG. 2 being an enlarged view of A portion in FIG. 1. FIG. 3 being a righ-hand side view of FIG. 2, FIG. 4 being an enlarged view of B portion in FIG. 2 showing another shape of cancave and convex portions, and FIG. 5 being a view showing another example of outer circumference shape of sensor rotor coresponding to C portion in FIG. 3.

An inner circumference surface of a non-rotating outer ring 1 mounted to a automobile body forms double inner raceway tracks 10,10, and an outer circumference surface of a wheel shaft 4 and an inner ring 3 penetrated on the inner side thereof by the wheel shaft 4 forms double outer raceway tracks 11,11 respectively. Retainers 6,6 is provided in order to support rolling elements 5,5 between the inner raceway tracks 10,10 and the outer raceway tracks 11,11, so that the wheel shaft 4 can rotate freely on the inner side of the outer ring 1. On the end portion outer circumference surface of the wheel shaft 4, a frange 2 for securing a wheel thereto are provided.

Moreover on the end surface center of the wheel shaft 4, a round cancave portion 12 is formed, and on the center portion of the disklike sensor rotor 7, the convex portion 13 is formed to fit the cancave portion 12 of the wheel shaft 4. These cancave portion 12 and convex portion 13 are fit each other, and then, on condition that the center of the wheel shaft 4 and the center of the sensor rotor 7 are conformed, the sensor rotor 7 is secured by means of welding such as spot welding to the end surface of the wheel shaft 4.

In a bearing unit with a sensor of the present invention, the way of sensing the rotating speed of the wheel secured to the wheel shaft 4 is identical with the above mentioned conventional bearing unit with a sensor. Namely the sensor 8 secured to a lid body 9 senses the rotating speed of the sensor rotor 7 secured to the end surface of the wheel shaft 4, and then judges the rotating speed of the wheel.

According to a bearing unit with a sensor of the present invention, the sensor rotor 7 is secured by welding to the end surface of the wheel shaft 4, so that the installment length of the sensor rotor 7 becomes small and the length of the entire bearing unit also becomes small. Moreover by the cancave portion 12 formed on the end surface of the wheel shaft 4 being fitted with the convex portion 13 formed on the sensor rotor 7, the center of the sensor rotor 7 can be conformed easily to the center of the wheel shaft 4. So that the installment operation of the sensor rotor 7 is not complicate.

Moreover, the shapes of the cancave portion 12 formed on the end surface of the wheel shaft 4 and the convex portion 13 formed on the center of the sensor rotor 7 are spherical as shown in FIGS. 1 and 2, however another shape such as cylindrical type can be employed as shown in FIG. 4.

Furthermore in order to form the cancave portion 12 and the canvex portion 13, the convex portion may be formed on the end surface of the wheel shaft 4 and the cancave portion may be formed on the center of the sensor rotor 7 respectively, which is reverse to the examples shown in the drawings.

As shown in FIG. 3, a plurality of penetrating holes 14,14 are arranged uncontinuously near circumference edge portion of the sensor rotor 7 in order to sense the rotating speed. Further cut-out cancave portions 15,15 may be arranged on the outer circumference edge of the sensor rotor 7 to form a gear shape instead of the penetrating holes.

Figure 6:
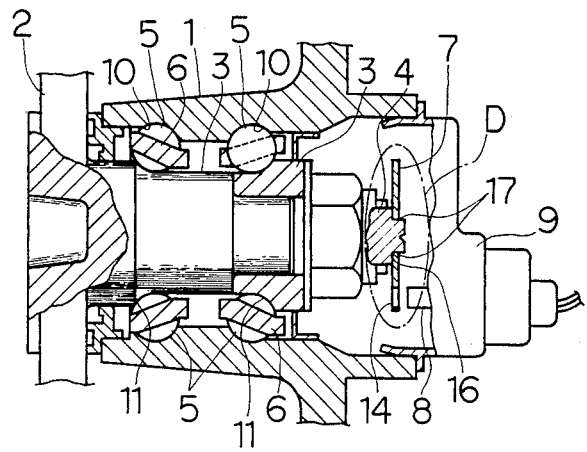
FIGS. 6 through 8 show a second embodiment of a bearing unit with a sensor according to the present invention.
Figure 8:
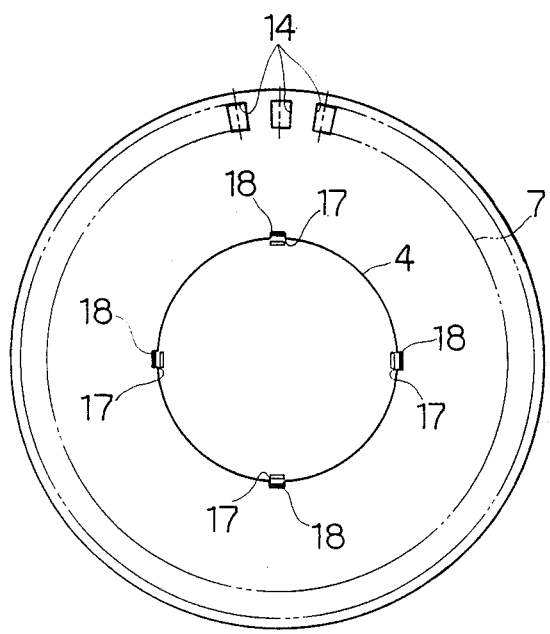
Figure 7:
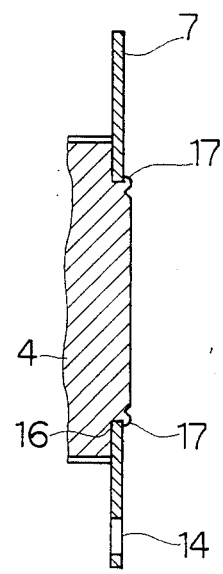
Figure 9:
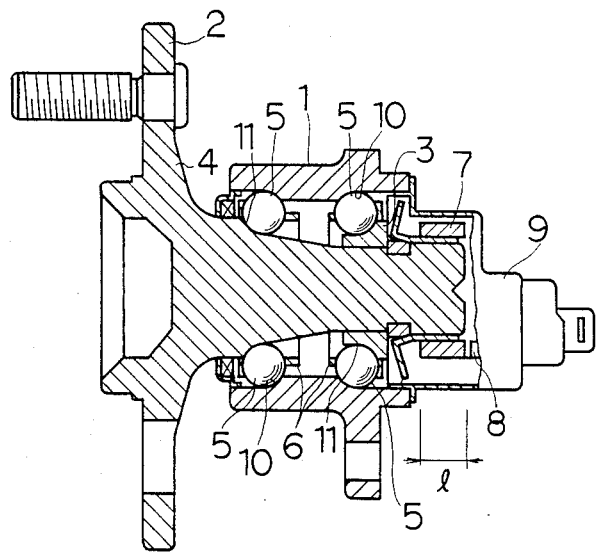
FIG. 9 is a sectional view showing a conventional bearing unit with a sensor.

FIG. 6 through 8 show a second embodiment of a bearing unit with a sensor of the present invention. In the second embodiment, a stepped small diameter portion 16 is formed around the entire circumference on the end surface circumference edge portion of the wheel shaft 4. The sensor rotor 7 are formed into ring shape, and the inner circumference edge portion of the sensor rotor 7 are fit to the small diameter portion 16.

A plurality of the end edge portions of the small diameter portion 16 are staken outwardly to the inner circumference edge of the sensor rotor 7. The staking portions are designated numeral 17,17. The staking portions 17,17 secure the sensor rotor 7 to the end surface of the wheel shaft 4. Cut-outs 18,18 are formed on a or several portions of the inner circumference edge portion of the sensor rotor 7. Then the staking portions 17,17 transformed outwardly by staking are fit to the cut-outs 18,18, so that the sensor rotor 17 is prevented reliably from rotating against the wheel shaft 4.

The second embodiment has the same construction with respect to other element and function as those of the first embodiment described above. In this embodiment, the installment length of the sensor rotor 7 becomes small, and the entire length of the bearing unit also becomes small. Moreover by the small diameter portion 16 formed on the end surface of the wheel shaft 4 being fit with the ring-shape sensor rotor , the center of the sensor rotor 7 can be conformed easily to the center of the wheel shaft 4. So that the installment operation of the sensor rotor is not complicate.

According to the present invention, without the assembly operation being difficult and the structure being complicate, the shaft-direction length of the bearing unit can be small, and further the rotation-sensing portion can be smallsized.

WHAT IS CLAIMED IS:

1. A bearing unit having a sensor comprising
   (a) a non-rotating outer ring-like member forming an inner raceway track on an inner circumference thereof,
   (b) a rotating inner ring-like member forming an outer raceway track on an outer circumference surface thereof,
   (c) a rolling bearing having a plurality of rolling elements contacting said inner raceway track and said outer raceway track respectively,
   (d) a concave portion or convex portion formed on an end surface center of a wheel shaft rotating with said inner ring-like member, (e) a disklike sensor rotor forming on a center thereof a convex portion or concave portion which is fit to said concave portion or convex portion, and secured by welding to the end surface of said wheel shaft on condition that said concave portion and said convex portion are fit, and (f) a sensor attached, opposing said sensor rotor, to a lid body covering an end portion opening of said outer ring-like member.

\* \* \* \* \*